United States Patent
Min et al.

(10) Patent No.: US 10,277,383 B2
(45) Date of Patent: Apr. 30, 2019

(54) ACCESS POINT (AP), STATION (STA) AND METHOD FOR ALLOCATION OF RESOURCES FOR FULL-DUPLEX (FD) COMMUNICATION IN HIGH-EFFICIENCY (HE) ARRANGEMENTS

(71) Applicant: Intel Corporation, Santa Clara, CA (US)

(72) Inventors: Alexander W. Min, Portland, OR (US); Minyoung Park, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 124 days.

(21) Appl. No.: 15/274,780

(22) Filed: Sep. 23, 2016

(65) Prior Publication Data

US 2018/0091284 A1    Mar. 29, 2018

(51) Int. Cl.
| | |
|---|---|
| *H04L 5/14* | (2006.01) |
| *H04L 5/00* | (2006.01) |
| *H04W 74/02* | (2009.01) |
| *H04W 84/12* | (2009.01) |
| *H04W 88/08* | (2009.01) |
| *H04L 27/26* | (2006.01) |

(52) U.S. Cl.
CPC .......... *H04L 5/1469* (2013.01); *H04L 5/0037* (2013.01); *H04W 74/02* (2013.01); *H04L 27/26* (2013.01); *H04W 84/12* (2013.01); *H04W 88/08* (2013.01)

(58) Field of Classification Search
CPC ..... H04L 5/1469; H04L 5/0037; H04L 27/26; H04W 74/02; H04W 84/12; H04W 88/08
See application file for complete search history.

(56) References Cited

U.S. PATENT DOCUMENTS

| | | | |
|---|---|---|---|
| 9,820,300 B2* | 11/2017 | Kim | H04W 74/04 |
| 2010/0177719 A1* | 7/2010 | Shao | H04W 74/0808 370/329 |
| 2011/0096863 A1* | 4/2011 | Lee | H04L 27/18 375/295 |
| 2011/0116435 A1* | 5/2011 | Liu | H04L 1/1664 370/312 |
| 2011/0142029 A1* | 6/2011 | Kasslin | H04W 92/02 370/350 |
| 2012/0157151 A1* | 6/2012 | Chu | H04W 52/40 455/522 |

(Continued)

*Primary Examiner* — Ajay Cattungal
(74) *Attorney, Agent, or Firm* — Schwegman Lundberg & Woessner, P.A.

(57) ABSTRACT

Embodiments of an access point (AP), station (STA) and method for full-duplex (FD) communication are generally described herein. The AP may contend for a transmission opportunity (TXOP) during which the AP is to control access to channel resources. During the TXOP, the AP may request to receive uplink data demands from a first group of STAs; receive the uplink data demands; allocate, based at least partly on the uplink data demands, resource units (RUs) of the channel resources for an OFDMA transmission of uplink data; and schedule a full-duplex (FD) communication in which the AP is to use overlapping portions of the channel resources during overlapping time periods of the TXOP to receive the uplink data and to transmit downlink data to a second group of one or more STAs.

20 Claims, 8 Drawing Sheets

(56) References Cited

U.S. PATENT DOCUMENTS

2013/0155953 A1\* 6/2013 Chu .................. H04W 28/20
                                                  370/328
2013/0286959 A1\* 10/2013 Lou .................. H04W 72/04
                                                  370/329
2016/0255625 A1\* 9/2016 Kim .................. H04W 74/04
                                                  370/336

\* cited by examiner

ACCESS POINT (AP), STATION (STA) AND METHOD FOR ALLOCATION OF RESOURCES FOR FULL-DUPLEX (FD) COMMUNICATION IN HIGH-EFFICIENCY (HE) ARRANGEMENTS

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11ac standard or the IEEE 802.11ax study group (SG) (named DensiFi). Some embodiments relate to high-efficiency (HE) wireless or high-efficiency WLAN or Wi-Fi communications. Some embodiments relate to full-duplex (FD) communication and/or half-duplex (HD) communication, including allocation of resources for FD communication and/or HD communication.

BACKGROUND

Wireless communications have been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low to moderate data rate requirements (with respect to the very high data rates of IEEE 802.11ac). A recently-formed study group for Wi-Fi evolution referred to as the IEEE 802.11 High Efficiency WLAN (HEW) study group (SG) (i.e., IEEE 802.11ax) is addressing these high-density deployment scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
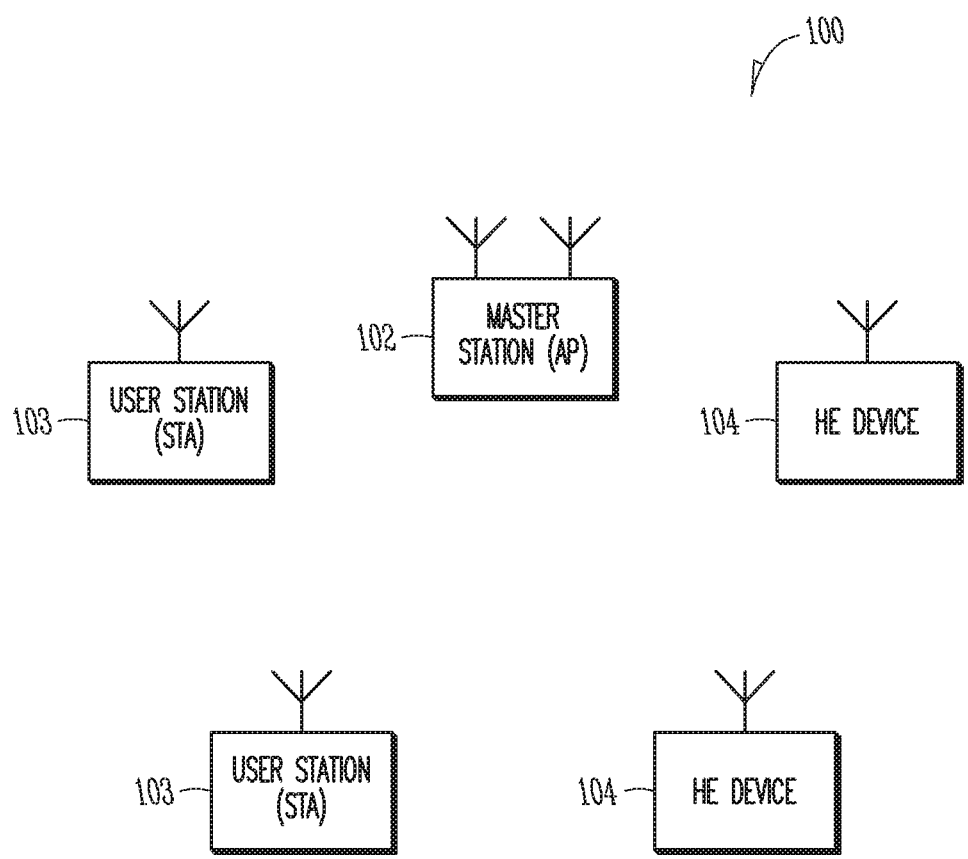
FIG. 1 illustrates a wireless network in accordance with some embodiments.

FIG. 1 illustrates a wireless network in accordance with some embodiments. In some embodiments, the network 100 may be a High Efficiency (HE) Wireless Local Area Network (WLAN) network. In some embodiments, the network 100 may be a WLAN or a Wi-Fi network. These embodiments are not limiting, however, as some embodiments of the network 100 may include a combination of such networks. That is, the network 100 may support HE devices in some cases, non HE devices in some cases, and a combination of HE devices and non HE devices in some cases. Accordingly, it is understood that although techniques described herein may refer to either a non HE device or to an HE device, such techniques may be applicable to both non HE devices and HE devices in some cases.

Referring to FIG. 1, the network 100 may include any or all of the components shown, and embodiments are not limited to the number of each component shown in FIG. 1. In some embodiments, the network 100 may include a master station (AP) 102 and may include any number (including zero) of stations (STAs) 103 and/or HE devices 104. In some embodiments, the AP 102 may transmit downlink data to one or more STAs 103. In some embodiments, the AP 102 may receive uplink data from one or more STAs 103. These embodiments will be described in more detail below.

The AP 102 may be arranged to communicate with one or more of the components shown in FIG. 1 in accordance with one or more IEEE 802.11 standards (including 802.11ax and/or others), other standards and/or other communication protocols. It should be noted that embodiments are not limited to usage of an AP 102. References herein to the AP 102 are not limiting and references herein to the master station 102 are also not limiting. In some embodiments, a STA 103, HE device 104 and/or other device may be configurable to operate as a master station. Accordingly, in such embodiments, operations that may be performed by the AP 102 as described herein may be performed by the STA 103, HE device 104 and/or other device that is configurable to operate as the master station.

In some embodiments, one or more of the STAs 103 may be legacy stations. These embodiments are not limiting, however, as the STAs 103 may be configured to operate as HE devices 104 or may support HE operation in some embodiments. The master station 102 may be arranged to communicate with the STAs 103 and/or the HE stations 104 in accordance with one or more of the IEEE 802.11 standards, including 802.11ax and/or others. In accordance with some HE embodiments, an access point (AP) may operate as the master station 102 and may be arranged to contend for a wireless medium (e.g., during a contention period) to receive exclusive control of the medium for an HE control period (i.e., a transmission opportunity (TXOP)). The master station 102 may, for example, transmit a master-sync or control transmission at the beginning of the HE control period to indicate, among other things, which HE stations 104 are scheduled for communication during the HE control period. During the HE control period, the scheduled HE stations 104 may communicate with the master station 102 in accordance with a non-contention based multiple access technique. This is unlike conventional Wi-Fi communications in which devices communicate in accordance with a contention-based communication technique, rather than a non-contention based multiple access technique. During the HE control period, the master station 102 may communicate with HE stations 104 using one or more HE PPDUs. During the HE control period, STAs 103 not operating as HE devices may refrain from communicating in some cases. In some embodiments, the master-sync transmission may be referred to as a control and schedule transmission.

In some embodiments, the multiple-access technique used during the HE control period may be a scheduled orthogonal frequency-division multiple access (OFDMA) technique, although this is not a requirement. In some embodiments, the multiple access technique may be a time-division multiple access (TDMA) technique or a frequency-division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HE control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the HE stations 104 outside the HE control period in accordance with legacy IEEE 802.11 communication techniques, although this is not a requirement.

In some embodiments, the HE communications during the control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, sub-channel bandwidths less than 20 MHz may also be used. In these embodiments, each channel or sub-channel of an HE communication may be configured for transmitting a number of spatial streams.

In some embodiments, high-efficiency (HE) wireless techniques may be used, although the scope of embodiments is not limited in this respect. As an example, techniques included in 802.11ax standards and/or other standards may be used. In accordance with some embodiments, a master station 102 and/or HE stations 104 may generate an HE packet in accordance with a short preamble format or a long preamble format. The HE packet may comprise a legacy signal field (L-SIG) followed by one or more HE signal fields (HE-SIG) and an HE long-training field (HE-LTF). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wireless Local Area Network operation and/or high-efficiency Wi-Fi operation.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
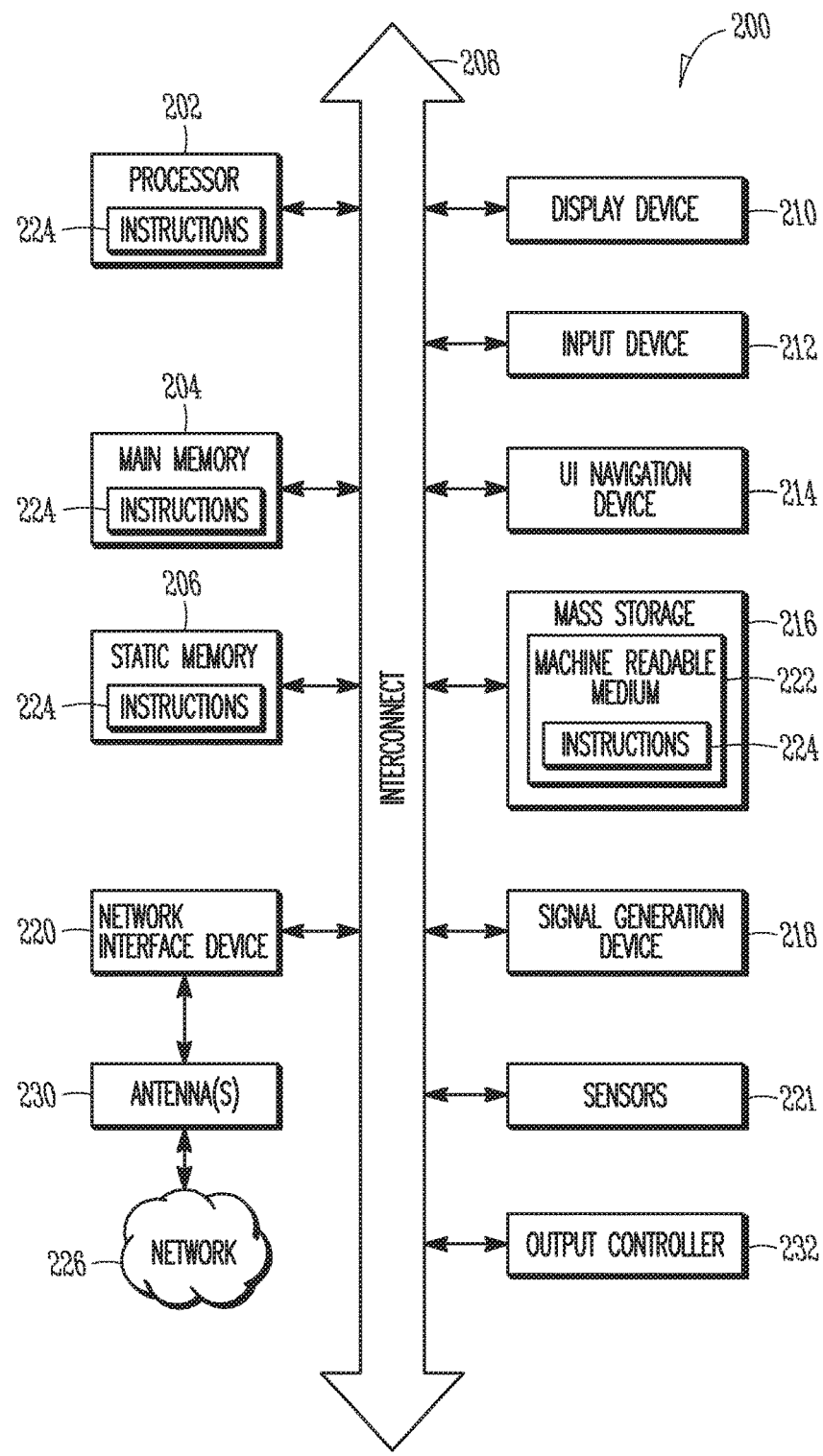
FIG. 2 illustrates an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be an AP 102, STA 103, HE device, HE AP, HE STA, UE, eNB, mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB)), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
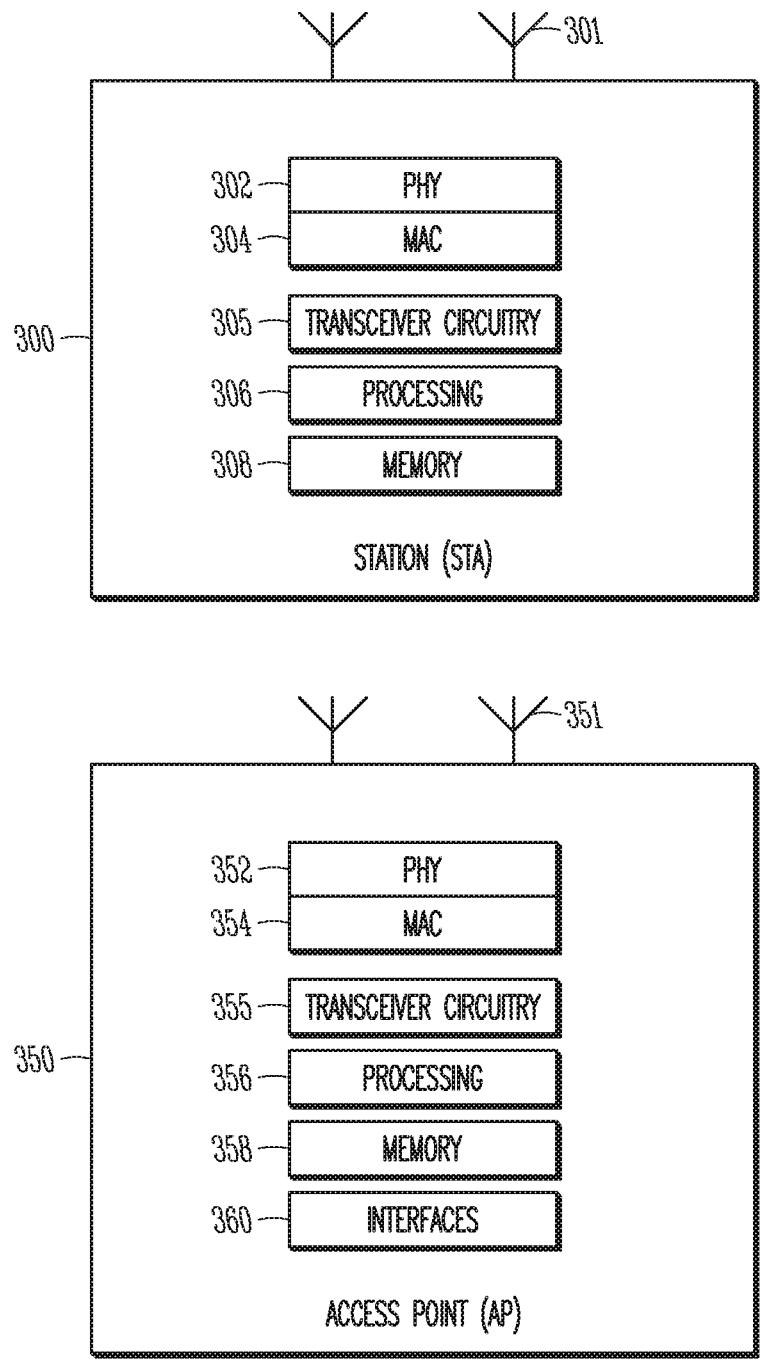
FIG. 3 illustrates a station (STA) in accordance with some embodiments and an access point (AP) in accordance with some embodiments.

FIG. 3 illustrates a station (STA) in accordance with some embodiments and an access point (AP) in accordance with some embodiments. It should be noted that in some embodiments, an STA or other mobile device may include some or all of the components shown in either FIG. 2 or FIG. 3 (as in 300) or both. The STA 300 may be suitable for use as an STA 103 as depicted in FIG. 1, in some embodiments. It should also be noted that in some embodiments, an AP or other base station may include some or all of the components shown in either FIG. 2 or FIG. 3 (as in 350) or both. The AP 350 may be suitable for use as an AP 102 as depicted in FIG. 1, in some embodiments.

The STA 300 may include physical layer circuitry 302 and a transceiver 305, one or both of which may enable transmission and reception of signals to and from components such as the AP 102 (FIG. 1), other STAs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The STA 300 may also include medium access control (MAC) layer circuitry 304 for controlling access to the wireless medium. The STA 300 may also include processing circuitry 306 and memory 308 arranged to perform the operations described herein.

The AP 350 may include physical layer circuitry 352 and a transceiver 355, one or both of which may enable transmission and reception of signals to and from components such as the STA 103 (FIG. 1), other APs or other devices using one or more antennas 351. As an example, the physical layer circuitry 352 may perform various encoding and decoding functions that may include formation of baseband signals for transmission and decoding of received signals. As another example, the transceiver 355 may perform various transmission and reception functions such as conversion of signals between a baseband range and a Radio Frequency (RF) range. Accordingly, the physical layer circuitry 352 and the transceiver 355 may be separate components or may be part of a combined component. In addition, some of the described functionality related to transmission and reception of signals may be performed by a combination that may include one, any or all of the physical layer circuitry 352, the transceiver 355, and other components or layers. The AP 350 may also include medium access control (MAC) layer circuitry 354 for controlling access to the wireless medium. The AP 350 may also include processing circuitry 356 and memory 358 arranged to perform the operations described herein.

The antennas 301, 351, 230 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 301, 351, 230 may be effectively separated to take advantage of spatial diversity and the different channel characteristics that may result.

In some embodiments, the STA 300 may be configured as an HE device 104 (FIG. 1), and may communicate using OFDM and/or OFDMA communication signals over a multicarrier communication channel. In some embodiments, the AP 350 may be configured to communicate using OFDM and/or OFDMA communication signals over a multicarrier communication channel. In some embodiments, the HE device 104 may be configured to communicate using OFDM communication signals over a multicarrier communication channel. Accordingly, in some cases, the STA 300, AP 350 and/or HE device 104 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HE standards, although the scope of the embodiments is not limited in this respect as they may also be suitable to transmit and/or receive communications in accordance with other techniques and standards. In some other embodiments, the AP 350, HE device 104 and/or the STA 300 configured as an HE device 104 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect. Embodiments disclosed herein provide two preamble formats for High Efficiency (HE) Wireless LAN standards specification that is under development in the IEEE Task Group 11ax (TGax).

In some embodiments, the STA 300 and/or AP 350 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the STA 300 and/or AP 350 may be configured to operate in accordance with 802.11 standards, although the scope of the embodiments is not limited in this respect. Mobile devices or other devices in some embodiments may be configured to operate according to other protocols or standards, including other IEEE standards, Third Generation Partnership Project (3GPP) standards or other standards. In some embodiments, the STA 300 and/or AP 350 may include one or more of a keyboard, a display, a non-volatile memory port, multiple antennas, a graphics processor, an application processor, speakers, and other mobile device elements. The display may be an LCD screen including a touch screen.

Although the STA 300 and the AP 350 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the STA 300 may include various components of the STA 300 as shown in FIG. 3 and/or the example machine 200 as shown in FIG. 2. Accordingly, techniques and operations described herein that refer to the STA 300 (or 103) may be applicable to an apparatus for an STA, in some embodiments. It should also be noted that in some embodiments, an apparatus used by the AP 350 may include various components of the AP 350 as shown in FIG. 3 and/or the example machine 200 as shown in FIG. 2. Accordingly, techniques and operations described herein that refer to the AP 350 (or 102) may be applicable to an apparatus for an AP, in some embodiments. In addition, an apparatus for a mobile device and/or base station may include one or more components shown in FIGS. 2-3, in some embodiments. Accordingly, techniques and operations described herein that refer to a mobile device and/or base station may be applicable to an apparatus for a mobile device and/or base station, in some embodiments.

In accordance with some embodiments, the AP 102 may contend for a transmission opportunity (TXOP) during which the AP 102 is to control access to channel resources. The AP 102 may transmit, during the TXOP, a probe request frame that indicates a request to receive uplink data demands from a first group of STAs 103. The AP 102 may receive one or more probe response frames that indicate the uplink data demands. The probe response frames may be included in a multi-user orthogonal frequency division multiple access (OFDMA) signal received from the STAs 103 of the first group during the TXOP. The AP 102 may allocate, based at least partly on the uplink data demands, resource units (RUs) of the channel resources to the STAs 103 of the first group for an OFDMA transmission of uplink data. The AP 102 may schedule a full-duplex (FD) communication in which the AP 102 is to use overlapping portions of the channel resources during overlapping time periods of the TXOP to receive the uplink data and to transmit downlink data to a second group of one or more STAs 103. As part of the FD communication, the reception of at least a portion of the uplink data and the transmission of at least a portion of the downlink data may be scheduled to be performed simultaneously in overlapping portions of the channel resources. These embodiments will be described in more detail below.

Figure 4:
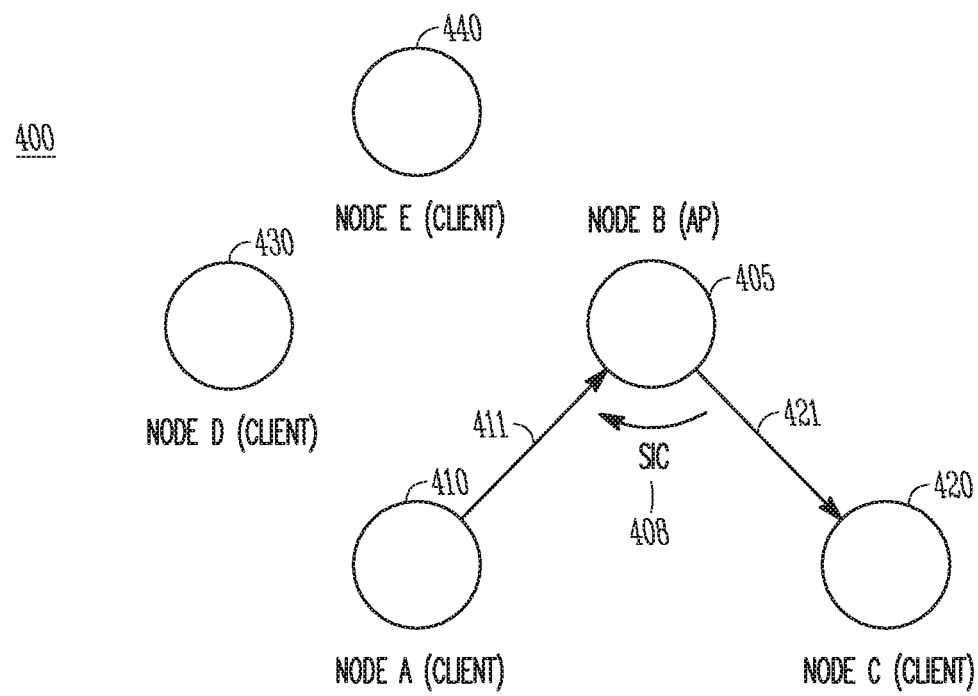
FIG. 4 illustrates an example scenario in which full-duplex (FD) and/or half-duplex (HD) communication may be used in accordance with some embodiments.
Figure 4:
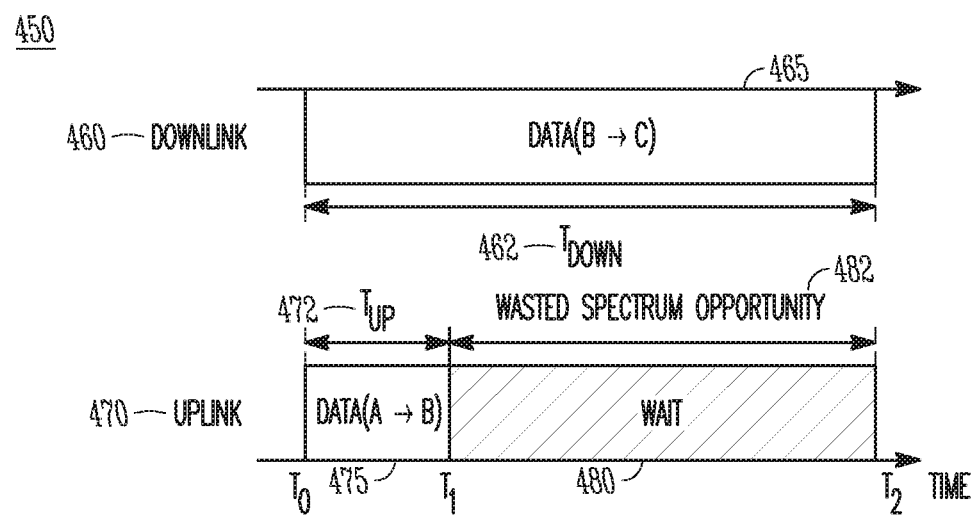

FIG. 4 illustrates an example scenario in which FD and/or HD communication may be used in accordance with some embodiments. It should be noted that the example scenario 400 shown in FIG. 4 may illustrate some or all of the concepts and techniques described herein in some cases, but embodiments are not limited by the example scenario 400. For instance, embodiments are not limited by the name, number, type, size, ordering, arrangement and/or other aspects of the frames, signals, fields, data blocks, time resources, channel resources and other elements as shown in FIG. 4. Although some of the elements shown in the examples of FIG. 4 may be included in an 802.11 standard and/or other standard, embodiments are not limited to usage of such elements that are included in standards.

Referring to FIG. 4, in the example scenario 400, full-duplex (FD) communication with OFDMA-aggregated uplink and downlink transmissions among an FD-capable AP 405 and half-duplex (HD) capable STAs 410-440 is illustrated. It should be noted that as part of FD operation, a device may transmit and receive signals in time resources and channel resources that overlap. In some cases, the time resources and/or channel resources may substantially overlap. In some embodiments, as part of an FD communication, the AP 405 of FIG. 4 may transmit downlink signal(s) (such as data, control and/or other) to one or more of the STAs 410-440, while one or more of the STAs 410-440 may transmit uplink signal(s) (such as data, control and/or other) to the AP 405. The downlink and uplink transmissions may be performed in time and channel resources that overlap. In some cases, such overlap may be substantial (such as at least 50%, at least 70%, at least 90% and/or other suitable percentage). Accordingly, as part of the FD communication, the downlink and uplink transmissions may be performed in time periods that substantially overlap and in channel resources that substantially overlap. In accordance with HD operation, the STAs 410-440 may transmit signals or receive signals during a time period, but generally may not transmit and receive signals in the same time resources and channel resources.

In the example scenario 400 shown in FIG. 4, as part of an FD communication, the AP 405 (labeled as "node B") may transmit a downlink signal to the STA 420 (labeled as "node C") on the link 421 and may receive an uplink signal from the STA 410 (labeled as "node A") on the link 411. In some embodiments, the AP 405 may perform one or more self-interference cancellation (SIC) operations as indicated by 408. For instance, the downlink transmission over link 421 by the AP 405 may cause self-interference that may affect the ability of the AP 405 to receive the uplink signal over link 411. Such self-interference may cause undesired effects, in some cases, such as frame loss, lower throughput, reduction of overall spectrum efficiency and/or others. The SIC operations may reduce, mitigate and/or cancel the self-interference, in some cases.

Continuing the example in FIG. 4, in the timing diagram 450, the downlink transmission over the link 421 is shown as downlink transmission 465 from node B (the AP 405) to node C (the STA 420). In this case, the downlink transmission 465 is performed during the time period Tdown 462 between times t0 and t2. The uplink transmission over the link 411 is shown as uplink transmission 475 from node A (the STA 410) to node B (the AP 405). In this case, the uplink transmission 475 is performed during the time period Tup 472 between times t0 and t1. The time period Tup 472 is less than the time period Tdown 462 in this example, and the time period 480 between t1 and t2 (labeled as a "wait period") may be considered a wasted spectrum opportunity. For instance, when an amount of uplink data to be transmitted by STA 410 is less than an amount of downlink data to be transmitted by the AP 405 to the STA 420, the uplink transmission 475 may be shorter than the downlink transmission 465. The time period 480 may be considered as a wasted opportunity to use FD by the AP, as the AP 405 does not receive uplink traffic during that time period 480.

Figure 5:
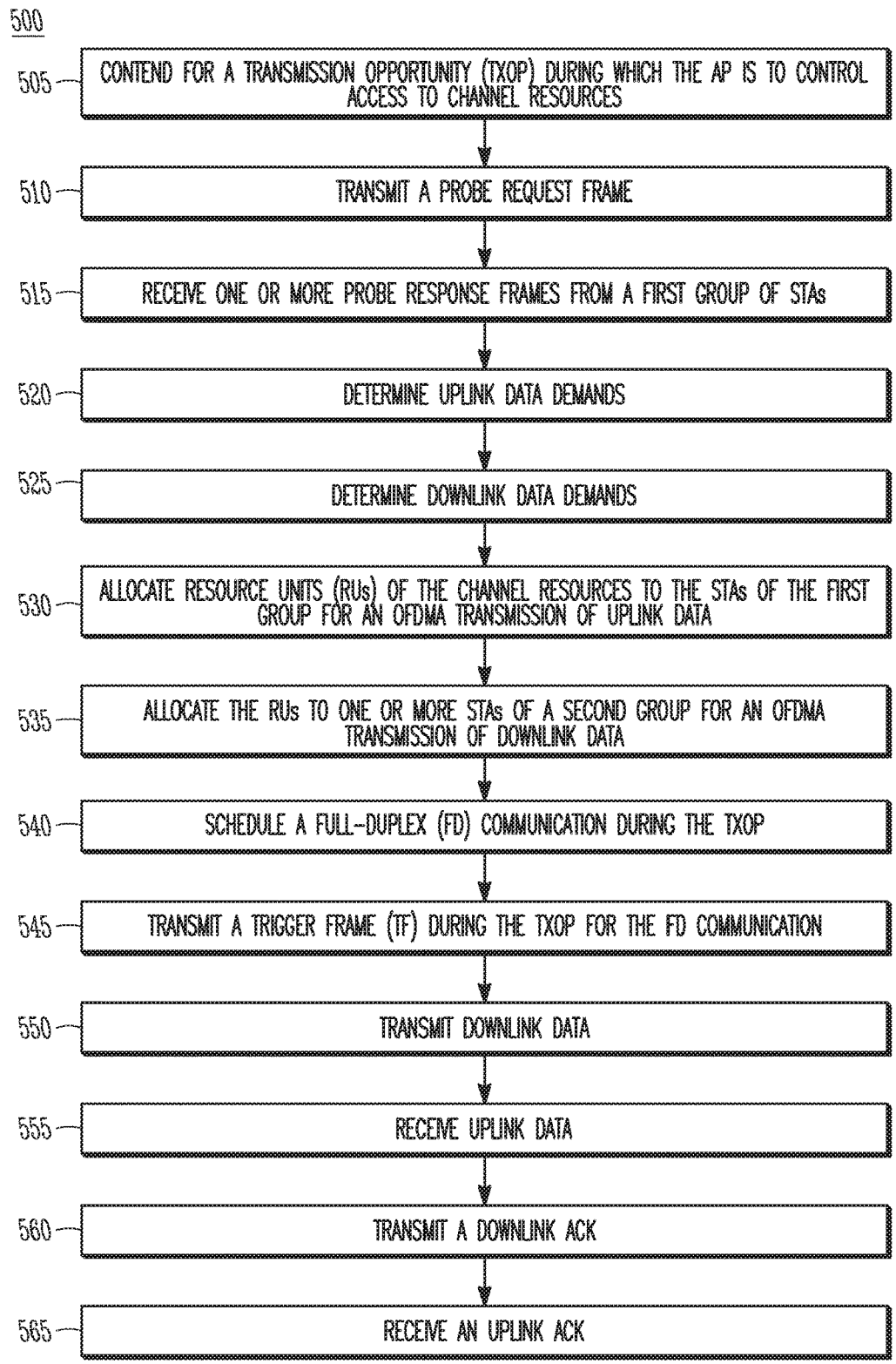
FIG. 5 illustrates the operation of a method of communication in accordance with some embodiments.

FIG. 5 illustrates the operation of a method of communication in accordance with some embodiments. It is important to note that embodiments of the method 500 may include additional or even fewer operations or processes in comparison to what is illustrated in FIG. 5. In addition, embodiments of the method 400 are not necessarily limited to the chronological order that is shown in FIG. 5. In describing the method 500, reference may be made to FIGS. 1-4 and 6-8, although it is understood that the method 500 may be practiced with any other suitable systems, interfaces and components.

In some embodiments, the AP 102 and/or STA 103 may be configurable to operate as an HE device 104. Although reference may be made to an AP 102 and/or STA 103 herein, including as part of the descriptions of the method 500 and/or other methods described herein, it is understood that an HE device 104, AP 102 configurable to operate as an HE device 104 and/or STA 103 configurable to operate as an HE device 104 may be used in some embodiments. In addition, the method 500 and other methods described herein may be applicable to STAs 103, HE devices 104 and/or APs 102 operating in accordance with one or more standards and/or protocols, such as 802.11, Wi-Fi, wireless local area network (WLAN) and/or other, but embodiments of those methods are not limited to just those devices. In some embodiments, the method 500 and other methods described herein may be practiced by other mobile devices, such as an Evolved Node-B (eNB) or User Equipment (UE). The method 500 and other methods described herein may also be practiced by wireless devices configured to operate in other suitable types of wireless communication systems, including systems configured to operate according to various Third Generation Partnership Project (3GPP) Long Term Evolution (LTE) standards. The method 500 may also be applicable to an apparatus for an STA 103, HE device 104 and/or AP 102 or other device described above, in some embodiments.

It should also be noted that embodiments are not limited by references herein (such as in descriptions of the methods 500, 800 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

At operation 505 of the method 500, the AP 102 may contend for a TXOP. Any suitable contention based techniques may be used, including but not limited to contention techniques of an 802.11 standard and/or other standard. In some embodiments, during the TXOP, the AP 102 may receive exclusive access to the wireless medium (channel resources). For instance, the AP 102 may schedule and/or perform uplink communication and/or downlink communication with one or more STAs 103 during the TXOP. Such communication during the TXOP may be non-contention based, in some cases. In some embodiments, during the TXOP, the AP 102 may control access to the wireless medium (channel resources). The TXOP may be included in an 802.11 standard and/or other standard, in some embodiments. It should be noted, however, that embodiments are not limited to the TXOP, as other time periods may be used. Such time periods may or may not be included in a standard. For instance, an HE control period may be used, in some cases.

In some embodiments, the AP 102 may communicate with one or more STAs 103. As a non-limiting example, the AP 102 may communicate with one or more STAs 103 that are associated with the AP 102. As another non-limiting example, the AP 102 may communicate with one or more STAs 103 that have established communication with the AP 102, registered with the AP 102 and/or otherwise become communicatively coupled to the AP 102. Such actions may have occurred during a recent time period, in some cases (such as before a service timeout and/or other event). As another non-limiting example, the master group may include STAs to which the AP 102 has communicated and/or plans to communicate (in either the downlink or uplink direction or both).

At operation 510, the AP 102 may transmit a probe request frame during the TXOP. In some embodiments, the probe request frame may indicate a request to receive uplink data demands from a first group of STAs 103. The probe request frame may include one or more parameters, including but not limited to identifiers of the STAs 103 of the first group, an allocation of resource units (RUs) of the channel resources to the STAs 103 of the first group to be used for a multi-user (MU) OFDMA transmission of probe responses and/or other parameters. It should be noted that embodiments are not limited to usage of a probe request, as other frames, messages and/or requests may be used to request the uplink data demands from the group of STAs 103. For instance, an FD request frame may be used. In some embodiments, the FD request may or may not be dedicated for FD operation. The FD request frame may include other information not necessarily related to FD operation, in some embodiments.

At operation 515, the AP 102 may receive, from one or more STAs 103 of the first group, one or more probe response frames that indicate the uplink data demands. It should be noted that embodiments are not limited to usage of a probe response, as other frames, messages and/or requests may be used by the STAs 103 of the group to transmit the uplink data demands. For instance, an FD response frame may be used. In some embodiments, the FD response may or may not be dedicated for FD operation. The FD response frame may include other information not necessarily related to FD operation, in some embodiments.

In some embodiments, the probe response frames may be included in a multi-user OFDMA signal received from the STAs 103 of the first group during the TXOP. The OFDMA transmission of the probe response frames may be a multi-user OFDMA transmission, in some cases, but embodiments are not limited as such. For instance, the probe response frame(s) may be transmitted by a single STA 103, in some cases. In some cases, the transmitted signal from a single STA 103 may be an orthogonal frequency-division multiplexing (OFDM) signal. In some embodiments, an allocation of RUs indicated in the probe request frame may be used by the STAs 103 of the first group, although the scope of embodiments is not limited in this respect. As an example, the allocation of the RUs may be predetermined. As another example, the allocation of the RUs may be signaled in other control messages/frames.

In some embodiments, the uplink data demand of a particular STA 103 may be based on an amount of uplink data that the STA 103 intends to transmit, an amount of uplink data stored/queued at the STA 103, an allocation of uplink data to be requested by the STA 103 and/or other parameters related to uplink data. Embodiments are not limited to amounts of data (and/or sizes of data) such as the above, as data rates may also be used in some cases. For instance, the STA 103 may report an intended uplink data rate, requested uplink data rate and/or other rate, in some cases.

Figure 6:
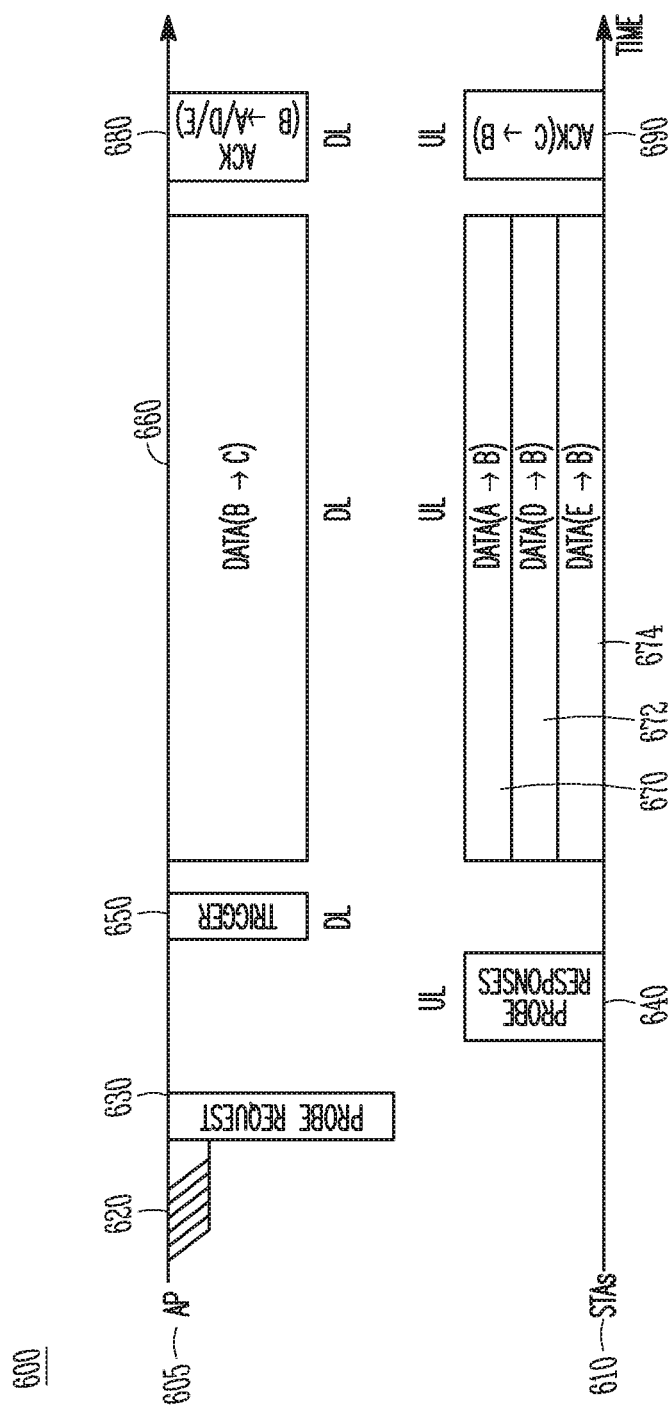
FIG. 6 illustrates another example scenario in which FD and/or HD communication may be used in accordance with some embodiments.
Figure 7:
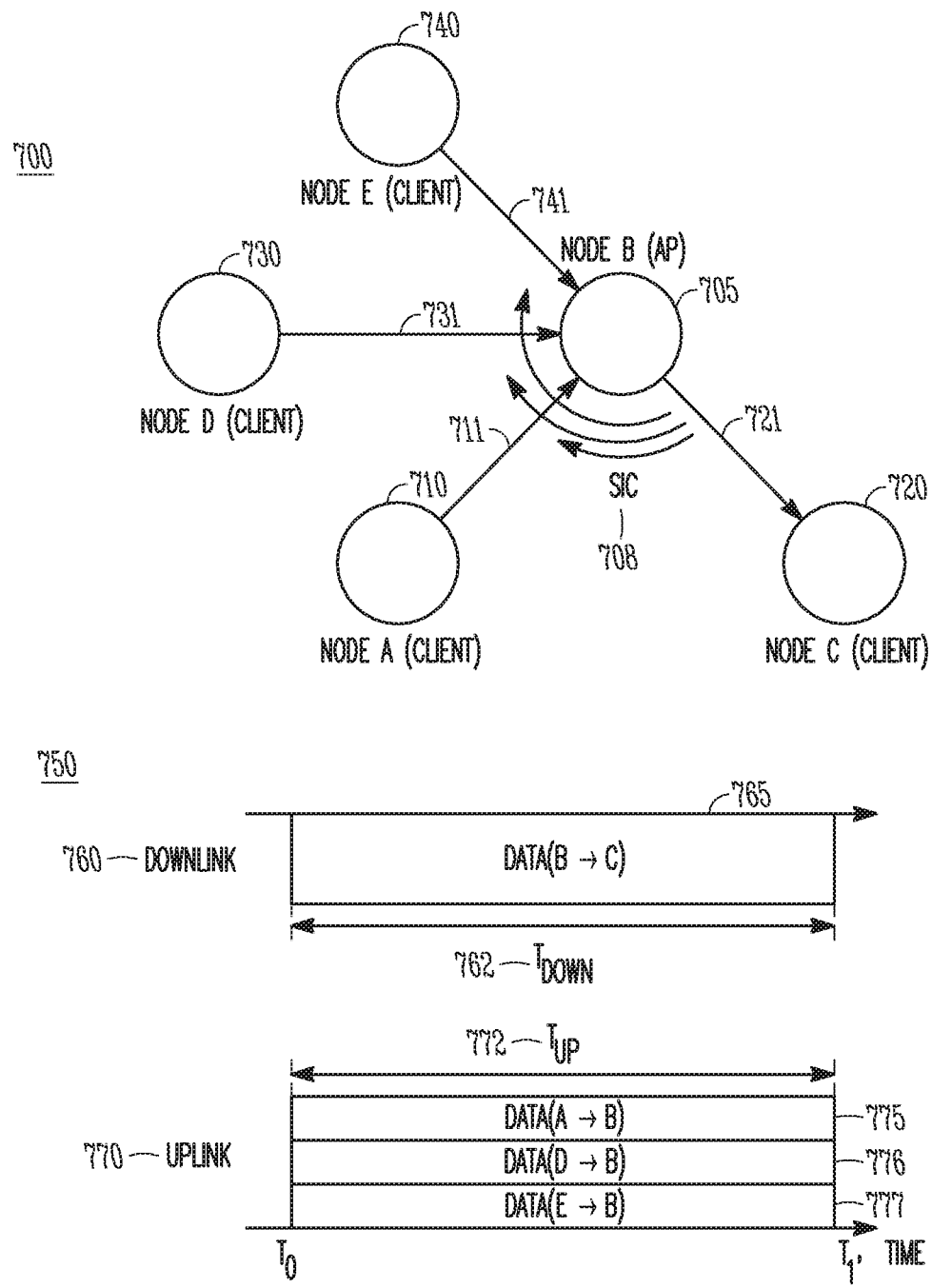
FIG. 7 illustrates another example scenario in which FD and/or HD communication may be used in accordance with some embodiments.

FIGS. 6 and 7 illustrate other example scenarios in which FD and/or HD communication may be used in accordance with some embodiments. It should be noted that the example scenarios shown in FIG. 6 and/or FIG. 7 may illustrate some or all of the concepts and techniques described herein (including but not limited to those of methods 500 and/or 800), but embodiments are not limited by the example scenarios shown in FIG. 6 and/or FIG. 7. For instance, embodiments are not limited by the name, number, type, size, ordering, arrangement and/or other aspects of the APs 102, STAs 103, frames, signals, fields, data blocks, time resources, channel resources and other elements as shown in FIG. 6 and/or FIG. 7. Although some of the elements shown in the examples of FIG. 6 and/or FIG. 7 may be included in an 802.11 standard and/or other standard, embodiments are not limited to usage of such elements that are included in standards.

Referring to FIG. 6, the AP 605 may contend for the TXOP during the time period indicated by 620. The probe request 630 may be transmitted by the AP 605 during the TXOP, and may be received by one or more STAs 610. One or more of the STAs 610 (such as STAs indicated by the probe request 630) may transmit one or more probe responses 640. In some embodiments, the probe response(s) may be transmitted as part of a multi-user OFDMA signal, although the scope of embodiments is not limited in this respect.

At operation 520, the AP 102 may determine uplink data demands for the STAs 103 of the first group. In some embodiments, the uplink data demands for the STAs 103 of the first group may be based on information included in the probe response(s). For instance, uplink data demands included in the probe response(s) received during the TXOP (such as 640 in FIG. 6) may be used. In addition, other information (such as uplink data demands received from the STAs 103 prior to the TXOP) may be used to determine the uplink data demands. Such information may be used in addition to or instead of uplink data demands received in the probe responses of the TXOP.

In some embodiments, the AP 102 may determine uplink data demands for other STAs 103 not indicated in the probe request frame. For instance, uplink data demands from probe response(s) previously received (such as before the TXOP) may also be stored by the AP 102. In some embodiments, other messages may be used to communicate the uplink data demands of the STAs 103 of the first group and/or other STAs 103.

It should be noted that the AP 102 may select one or more STAs 103 that are to be indicated by the probe request frame of the TXOP, from which the AP 102 requests to receive uplink data demands during the TXOP. The selection of the STAs 103 to be indicated by the probe request frame may be based on any factors, including but not limited to previous knowledge about uplink demands of a master group of STAs 103 (such as STAs 103 associated with the AP 102 and/or in communication with the AP 102), fairness of scheduling, expected transmission times for uplink and/or downlink transmissions, fairness in channel access among STAs 103, inter-node interference among AP 102 and STAs 103, target latencies from applications and/or other factors. Accordingly, the AP 102 may request uplink data demands from STAs 103 to which the AP 102 may decide to schedule for uplink data during the TXOP, although the scope of embodiments is not limited in this respect. In some cases, the AP 102 may request uplink data demands from STAs 103 from which uplink data may not necessarily be scheduled during the TXOP. For instance, the AP 102 may collect such information for future scheduling and/or other purposes.

At operation 525, the AP 102 may determine downlink data demands for one or more STAs 103. A group of STAs 103 for which the downlink data demands are determined may or may not overlap a group of STAs 103 for which the uplink data demands are determined. In some embodiments, the downlink data demand of a particular STA 103 may be based on an amount of downlink data that the AP 102 intends to transmit to the STA 103, an amount of downlink data stored/queued at the AP 102 that is to be transmitted to the STA 103, an allocation of downlink data to be requested by the STA 103 and/or other parameters related to downlink data. Embodiments are not limited to amounts of data (and/or sizes of data) such as the above, as data rates may also be used in some cases. For instance, a downlink data demand may be based on a downlink data rate determined by the AP 102; a downlink data rate requested by the STA 103 and/or AP 102, a downlink data rate of a communication between the STA 103 and an external component via the AP 102; and/or other rate.

At operation 530, the AP 102 may allocate RUs of the channel resources to the STAs 103 of the first group for a multi-user OFDMA transmission of uplink data during the TXOP. The OFDMA transmission of the uplink data may be a multi-user OFDMA transmission, in some cases, but embodiments are not limited as such. For instance, the uplink data may be transmitted by a single STA 103, in some cases, in which case an orthogonal frequency-division multiplexing (OFDM) signal may be transmitted. At operation 535, the AP 102 may allocate the RUs of the channel resources to a second group of STAs 103 for an OFDMA transmission of downlink data by the AP 102 during the TXOP. The OFDMA transmission of the downlink data may be a multi-user OFDMA transmission, in some cases, but embodiments are not limited as such. For instance, the downlink data may be intended for a single STA 103 in some cases, in which case an OFDM signal may be transmitted. At operation 540, the AP 102 may schedule a full-duplex (FD) communication in which the AP 102 is to use overlapping portions of the channel resources during overlapping time periods of the TXOP to receive the uplink data and to transmit the downlink data. In some embodiments, as part of the FD communication, the reception of at least a portion of the uplink data and the transmission of at least a portion of the downlink data may be performed simultaneously in overlapping portions of the channel resources.

The RUs may be allocated to the STAs 103 of the first group for the uplink data transmission in accordance with a first allocation that may be different from a second allocation of the RUs to the STAs 103 of the second group for the downlink data transmission. For instance, the RUs may be allocated to different numbers of STAs 103 for the uplink data transmission and downlink data transmission as part of the FD communication. That is, the first and second groups may include different numbers of STAs 103, in some cases.

In some embodiments, the uplink and/or downlink allocations may be configurable for allocation of variable sizes of groups of the RUs to different STAs 103. In some embodiments, an aggregate downlink throughput and an aggregate uplink throughput of the FD communication may be balanced by one or more techniques, including but not limited to usage of different numbers of STAs 103 in the first and second groups, allocation of different numbers of RUs to STAs 103 in the first group and/or second group and/or other techniques. In some embodiments, the AP 102 may determine an expected downlink throughput and/or an expected aggregate downlink throughput based at least partly on the downlink data demands. In some embodiments, the AP 102 may determine an expected uplink throughput and/or an expected aggregate uplink throughput based at least partly on the uplink data demands.

In some embodiments, the RUs may be allocated to the STAs 103 of the first group based at least partly on the determined uplink data demands of the STAs 103. In some embodiments, the RUs may be allocated to STAs 103 of the first group in a non-uniform manner to accommodate different uplink data demands of the STAs 103. For instance, a first STA 103 for which an uplink data demand is higher than an uplink data demand of a second STA 103 may be allocated more RUs than the second STA 103. Accordingly, the allocation of the RUs in a non-uniform manner may increase an aggregated uplink throughput in comparison to an aggregated uplink throughput for an allocation of fixed size groups of the RUs to the STAs of the first group. As a non-limiting example, the AP 102 may allocate variable size groups of the RUs to different STAs 103 of the first group in accordance with a non-decreasing relationship between the sizes of the groups of the RUs and the uplink data demands.

It should also be noted that in some cases, one or more STAs 103 of the first group may not necessarily be allocated any RUs for the uplink OFDMA transmission. For instance, the AP 102 may refrain from allocation of any RUs to a particular STA 103 when the uplink data demand of the STA 103 is below a predetermined threshold. In some cases, the AP 102 may allocate at least one of the RUs to another STA 103 that is not included in the first group. For instance, this may be performed based at least partly on an uplink data demand received from the other STA 103 prior to transmission of the probe request frame by the AP 102 (such as in a previous TXOP). It should also be noted that, in some cases, the AP 102 may allocate RUs to the STAs 103 of the first group in a uniform manner in which each STA 103 is allocated a same number of RUs.

At operation 545, the AP 102 may transmit, during the TXOP, a trigger frame (TF) that indicates, for the FD communication, one or more STAs 103 that are to transmit uplink data (uplink group of the STAs 103) and one or more STAs 103 that are to receive downlink data (downlink group of the STAs 103). In some embodiments, the TF may indicate the allocation of the RUs to the first group for the transmission of the uplink data and may further indicate information related to the transmission of the downlink data to the second group (such as an allocation of the RUs to the STAs 103 of the second group). It should be noted that embodiments are not limited to usage of the TF to communicate this information, as other frames may be used in some embodiments. As a non-limiting example, a full-duplex trigger frame (FD-TF), which may be a type of TF used to communicate scheduling information for FD communication, may be used.

At operation 550, the AP 102 may transmit one or more downlink data frames to one or more STAs 103 of the downlink group as part of the FD communication. At operation 555, the AP 102 may receive one or more uplink data frames from one or more STAs 103 of the uplink group as part of the FD communication. At operation 560 and 565, the AP 102 may exchange downlink acknowledgement (ACK) messages and/or uplink ACK messages with one or more STAs 103. The ACK messages may be related to data frames transmitted and/or received by the AP 102 during any suitable time period, including but not limited to the TXOP. It should be noted that, in some embodiments, operations 550 and 555 may be performed simultaneously and/or during time periods that at least partly overlap, although the scope of embodiments is not limited in this respect. It should be noted that, in some embodiments, operations 560 and 565 may be performed simultaneously and/or during time periods that at least partly overlap, although the scope of embodiments is not limited in this respect.

Referring to the example in FIG. 6, the AP 605 may transmit the TF 650 to indicate information for the downlink transmission 660 and STAs 610 may transmit the uplink transmissions 670, 672, 674. It should be noted that the embodiments are not limited to the number of different STAs 610 to which RUs are allocated for uplink transmission, as any suitable number may be used. Embodiments are also not limited to the downlink transmission to a single STA (labeled as "node C" in this case), as downlink transmission to any number of multiple STAs may also be performed. The acknowledgement messages 680 and 690 may be exchanged after the data transmissions 660, 670, 672, 674.

In the example scenario 700 shown in FIG. 7, as part of an FD communication, the AP 705 (labeled as "node B") may transmit a downlink signal to the STA 720 (labeled as "node C") on the link 721. The AP 705 may also receive an uplink signal from the STA 710 (labeled as "node A") on the link 711, an uplink signal from the STA 730 (labeled as "node D") on the link 731, and an uplink signal from the STA 740 (labeled as "node E") on the link 741. In some embodiments, the AP 705 may perform one or more self-interference cancellation (SIC) operations as indicated by 708. For instance, the downlink transmission over link 721 by the AP 705 may cause self-interference that may affect the ability of the AP 705 to receive the uplink signals over links 711, 731, 741. Such self-interference may cause undesired effects, in some cases, such as frame loss, lower throughput, reduction of overall spectrum efficiency and/or others. The SIC operations may reduce, mitigate and/or cancel the self-interference, in some cases.

Continuing the example in FIG. 7, in the timing diagram 750, the downlink transmission over the link 721 is shown as downlink transmission 765 from node B (the AP 705) to node C (the STA 720). In this case, the downlink transmission 765 is performed during the time period Tdown 762 between times t0 and t1. The uplink transmission over the link 711 is shown as uplink transmission 775 from node A (the STA 710) to node B (the AP 705). The uplink transmission over the link 731 is shown as uplink transmission 776 from node D (the STA 730) to node B (the AP 705). The uplink transmission over the link 741 is shown as uplink transmission 777 from node E (the STA 740) to node B (the AP 705). In this case, the uplink transmissions 775, 776, 777 are performed during the time period Tup 772 between times t0 and t1. In this case, the time periods Tup 772 and Tdown 762 are the same. In contrast to the scenario 400/450 shown in FIG. 4, the three STAs 710, 730, 740 are able to transmit uplink data during the same time period as the downlink transmission (from the AP 705 to STA 720) as part of an FD communication using MU-OFDMA. Accordingly, a better usage of the channel resources may be realized, in some cases, using the techniques illustrated in FIG. 7 in comparison to the techniques illustrated in FIG. 4.

In some embodiments, OFDMA-based FD communication using Multi-User (MU) OFDMA uplink and downlink transmissions between half-duplex capable STAs 710-740 and a full-duplex capable AP 705 may be used so that the AP 705 may match the uplink and downlink transmission time and minimize spectrum waste. For example, when there is a large downlink frame (such as frame 765 from the AP 705 to the STA 720 and multiple smaller uplink frames (such as frames 775, 776, 777 from the STAs 710, 730, 740 to the AP 705), the AP 705 may aggregate multiple uplink transmissions by allocating smaller resource blocks (or Resource Units (RUs) or sub-channels) to the multiple STAs 710, 730, 740 in an OFDMA packet format, as shown in the example scenario 700 in FIG. 7.

Figure 8:
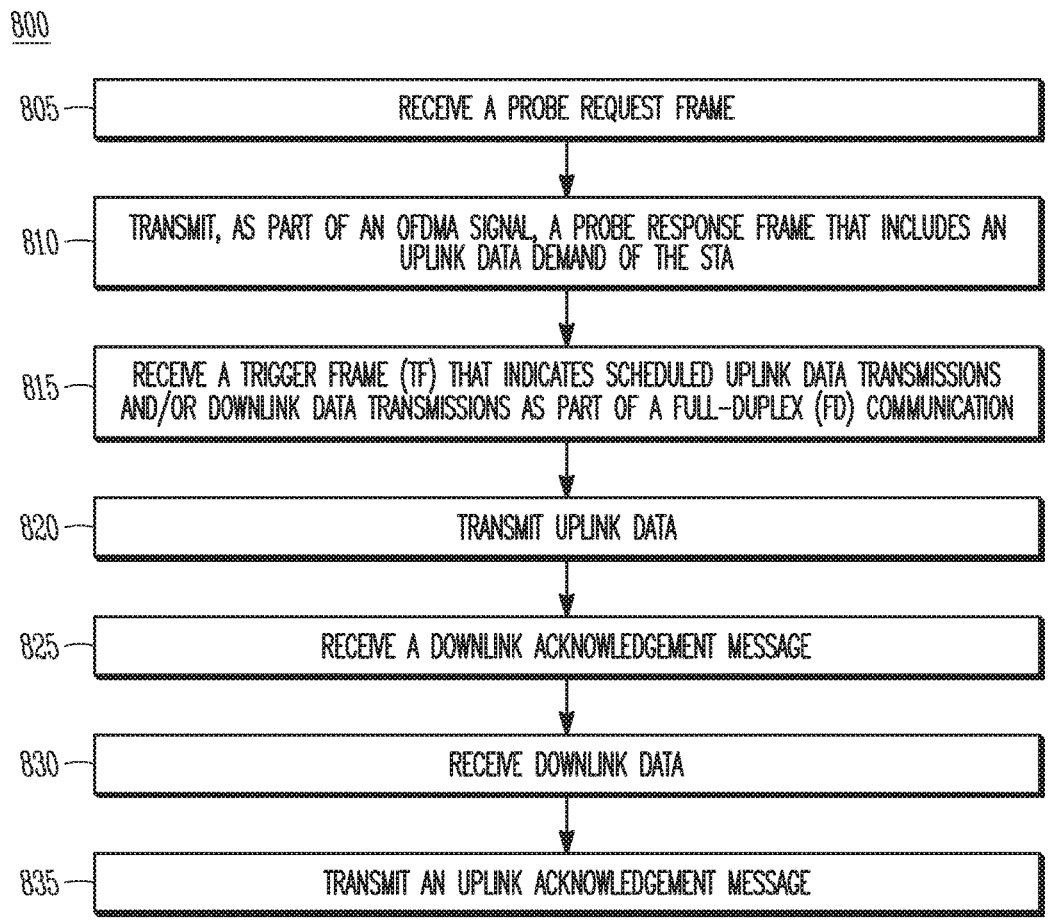
FIG. 8 illustrates the operation of another method of communication in accordance with some embodiments.

FIG. 8 illustrates the operation of another method of communication in accordance with some embodiments. As mentioned previously regarding the method 500, embodiments of the method 800 may include additional or even fewer operations or processes in comparison to what is illustrated in FIG. 8 and embodiments of the method 800 are not necessarily limited to the chronological order that is shown in FIG. 8. In describing the method 800, reference may be made to FIGS. 1-7, although it is understood that the method 800 may be practiced with any other suitable systems, interfaces and components. In addition, embodiments of the method 800 may be applicable to APs 102, STAs 103, UEs, eNBs or other wireless or mobile devices. The method 800 may also be applicable to an apparatus for an AP 102, STA 103 and/or other device described above.

It should be noted that the method 800 may be practiced by an STA 103 and may include exchanging of elements, such as frames, signals, messages, fields and/or other elements, with an AP 102. Similarly, the method 500 may be practiced at an AP 102 and may include exchanging of such elements with an STA 103. In some cases, operations and techniques described as part of the method 500 may be relevant to the method 800. In addition, embodiments of the method 800 may include operations performed at the STA 103 that are reciprocal to or similar to other operations described herein performed at the AP 102. For instance, an operation of the method 800 may include reception of a frame from the AP 102 by the STA 103 while an operation of the method 500 may include transmission of the same frame or similar frame by the AP 102.

In addition, previous discussion of various techniques and concepts may be applicable to the method 800 in some cases, contention, TXOPs, including full-duplex (FD), half-duplex (HD), probe request frames, probe response frames, uplink data demands, downlink data demands, trigger frames (TFs), allocation of RUs for downlink transmission, allocation of RUs for uplink transmission, acknowledgement frames and/or others. In addition, the examples shown in FIG. 6 and/or FIG. 7 may also be applicable, in some cases, although the scope of embodiments is not limited in this respect.

It should be noted that the STA 103 may be configured to perform HD communication, in some embodiments. The AP 102 may perform contention operations to obtain a TXOP, during which one or more of the operations of method 800 may be performed by the STA 103, although the scope of embodiments is not limited in this respect.

At operation 805, during the TXOP, the STA 103 may receive a probe request frame from an AP 102 that may indicate a request to receive uplink data demands from a group of one or more STAs 103. The probe request frame may further indicate an allocation of resource units (RUs) to the group of STAs 103 for transmission of probe response frames. The STA 103 may determine whether it is part of the group of STAs 103, in some embodiments. As an example, the STA 103 may decode a header field and/or other field that may identify the STAs 103 of the group. For instance, identifiers of the STAs 103 of the group may be indicated by the probe request frame, and the STA 103 may check if it is included in the group. One or more operations (including but not limited to operation 810) may or may not be performed by the STA 103 based on whether it is included in the group of STAs 103 identified by the probe request.

At operation 810, when the STA 103 is included in the group, the STA 103 may transmit a probe response frame during the TXOP that may include an uplink data demand. The probe response frame may be transmitted in one or more RUs allocated to the STA 103 in the probe request frame, in some embodiments.

At operation 815, the STA 103 may receive, during the TXOP, a trigger frame (TF) that may indicate an uplink group of one or more STAs 103 that are to transmit uplink data to the AP 102 during an FD period. The TF may further indicate a downlink group of one or more STAs 103 that are to receive downlink data from the AP 102 during the FD period. The TF may also include an allocation of the RUs for the downlink data transmission and/or uplink data transmission, in some embodiments.

Based on whether the STA 103 is included in the downlink group or uplink group, one or more of operations 820-835 may be performed by the STA 103 during the TXOP. In some embodiments, when the STA 103 is included in the uplink group, the STA 103 may transmit one or more uplink data frames (in one or more RUs indicated in the TF) at operation 820. The STA 103 may also receive a downlink acknowledgement message at operation 825 when the STA 103 is included in the uplink group. When the STA 103 is included in the downlink group, the STA 103 may receive one or more downlink data frames (in one or more RUs indicated in the TF) at operation 830. The STA 103 may also transmit an uplink acknowledgement message at operation 835 when the STA 103 is included in the downlink group. The acknowledgement messages may be related to the uplink data frames and/or downlink data frames of operations 820 and/or 830, in some cases, although the scope of embodiments is not limited in this respect.

It should be noted that the STA 103 may not necessarily perform all of operations 820-835, in some cases. In addition, the STA 103 may perform none of operations 820-835, in some cases. As an example, when the STA 103 is included in the uplink group, the STA 103 may perform one or both of operations 820 and 825 and may refrain from performing operations 830 and 835. When the STA 103 is included in the downlink group, the STA 103 may perform one or both of operations 830 and 835 and may refrain from performing operations 820 and 825. When the STA 103 is not included in the uplink group or downlink group, the STA 103 may refrain from performing operations 820-835.

In Example 1, apparatus of an access point (AP) may comprise memory. The apparatus may further comprise processing circuitry. The processing circuitry may be configured to contend for a transmission opportunity (TXOP) during which the AP is to control access to channel resources. The processing circuitry may be further configured to generate, for transmission during the TXOP, a probe request frame that indicates a request to receive uplink data demands from a first group of stations (STAs). The processing circuitry may be further configured to decode one or more probe response frames that indicate the uplink data demands. The probe response frames may be included in a multi-user orthogonal frequency division multiple access (OFDMA) signal received from the STAs of the first group during the TXOP. The processing circuitry may be further configured to allocate, based at least partly on the uplink data demands, resource units (RUs) of the channel resources to the STAs of the first group for an OFDMA transmission of uplink data. The processing circuitry may be further configured to schedule a full-duplex (FD) communication in which the AP is to use overlapping portions of the channel resources during overlapping time periods of the TXOP to receive the uplink data and to transmit downlink data to a second group of one or more STAs.

In Example 2, the subject matter of Example 1, wherein as part of the FD communication, the reception of at least a portion of the uplink data and the transmission of at least a portion of the downlink data may be performed simultaneously in overlapping portions of the channel resources.

In Example 3, the subject matter of one or any combination of Examples 1-2, wherein the uplink data demands may be based on sizes of uplink data or uplink data rates of the STAs of the first group.

In Example 4, the subject matter of one or any combination of Examples 1-3, wherein the processing circuitry may be further configured to allocate the RUs to the one or more STAs of the second group for an OFDMA transmission of the downlink data. The processing circuitry may be further configured to select different numbers of STAs for the first group of STAs and the second group of STAs to balance an aggregate downlink throughput and an aggregate uplink throughput of the FD communication.

In Example 5, the subject matter of one or any combination of Examples 1-4, wherein the processing circuitry may be further configured to allocate variable size groups of the RUs to different STAs of the first group in accordance with a non-decreasing relationship between the sizes of the groups of the RUs and the uplink data demands.

In Example 6, the subject matter of one or any combination of Examples 1-5, wherein the allocation of the variable size groups of the RUs to the STAs of the first group may be to enable an increase in an aggregated uplink throughput in comparison to an aggregated uplink throughput for an allocation of fixed size groups of the RUs to the STAs of the first group.

In Example 7, the subject matter of one or any combination of Examples 1-6, wherein the processing circuitry may be further configured to refrain from allocation of any RUs to one or more STAs of the first group for which the uplink data demands are below a predetermined threshold.

In Example 8, the subject matter of one or any combination of Examples 1-7, wherein the processing circuitry may be further configured to allocate at least one of the RUs to another STA that is not included in the first group based at least partly on an uplink data demand received from the other STA prior to transmission of the probe request frame by the AP.

In Example 9, the subject matter of one or any combination of Examples 1-8, wherein the processing circuitry may be further configured to generate a trigger frame (TF) for transmission during the TXOP. The TF may indicate the allocation of the RUs to the first group for the transmission of the uplink data and may further indicate information related to the transmission of the downlink data to the second group.

In Example 10, the subject matter of one or any combination of Examples 1-9, wherein the allocation of the RUs for the transmission of uplink data may be a first allocation. The probe request frame may further indicate a second allocation of the RUs to the STAs of the first group for transmission of the multi-user OFDMA signal that includes the probe response frames.

In Example 11, the subject matter of one or any combination of Examples 1-10, wherein the processing circuitry may be further configured to encode the downlink data for transmission to the second group as part of the FD communication. The processing circuitry may be further configured to decode the uplink data received as part of an OFDMA signal from the first group as part of the FD communication.

In Example 12, the subject matter of one or any combination of Examples 1-11, wherein the processing circuitry may include a baseband processor to generate the probe request frame, decode the probe response frames, allocate the RUs to the STAs of the first group, and schedule the FD communication.

In Example 13, the subject matter of one or any combination of Examples 1-12, wherein the apparatus may further include a transceiver to transmit the probe request frame and to receive the probe response frames.

In Example 14, a non-transitory computer-readable storage medium may store instructions for execution by one or more processors to perform operations for communication by an access point (AP). The operations may configure the one or more processors to determine uplink data demands and downlink data demands of one or more stations (STAs) of a master group of STAs. The operations may further configure the one or more processors to select, from the master group for a full-duplex (FD) communication, an uplink group of one or more STAs from which uplink data is to be received and a downlink group of one or more STAs to which downlink data is to be transmitted. The operations may further configure the one or more processors to determine, based at least partly on the uplink data demands and/or the downlink data demands, an uplink allocation of resource units (RUs) of the channel resources for an orthogonal frequency division multiple access (OFDMA) transmission by the uplink group and a downlink allocation of the RUs for an OFDMA transmission by the downlink group. The uplink and downlink allocations may be configurable for allocation of variable sizes of groups of the RUs to different STAs.

In Example 15, the subject matter of Example 14, wherein the operations may further configure the one or more processors to determine the variable size groups of the RUs to be allocated to the uplink group and/or downlink group to balance an expected uplink throughput of the FD communication and an expected downlink throughput of the FD communication. The expected uplink throughput may be based at least partly on the uplink data demands. The expected downlink throughput may be based at least partly on the downlink data demands.

In Example 16, the subject matter of one or any combination of Examples 14-15, wherein the operations may further configure the one or more processors to contend for a transmission opportunity (TXOP) during which the AP is to control access to channel resources. The operations may further configure the one or more processors to generate, for transmission during the TXOP, a probe request frame that indicates a request to receive one or more of the uplink data demands from one or more of the STAs of the master group. The operations may further configure the one or more processors to decode one or more probe response frames that include the uplink data demands. The probe response frames may be included in a multi-user orthogonal frequency division multiple access (OFDMA) signal received from the one or more STAs indicated in the probe request frame. The operations may further configure the one or more processors to schedule a full-duplex (FD) communication in which the AP is to use overlapping portions of the channel resources during overlapping portions of the TXOP to receive the uplink data and to transmit downlink data to a second group of one or more STAs.

In Example 17, a method of communication at an access point (AP) may comprise contending for a transmission opportunity (TXOP) during which the AP is to control access to channel resources. The method may further comprise generating, for transmission during the TXOP, a probe request frame that indicates a request to receive uplink data demands from a first group of stations (STAs). The method may further comprise decoding one or more probe response frames that include the uplink data demands, the probe response frames included in a multi-user orthogonal frequency division multiple access (OFDMA) signal received from the first group of STAs during the TXOP. The method may further comprise allocating, based at least partly on the uplink data demands, resource units (RUs) of the channel resources to the STAs of the first group for an OFDMA transmission of uplink data. The method may further comprise scheduling a full-duplex (FD) communication in which the AP is to use overlapping portions of the channel resources during overlapping time periods of the TXOP to receive the uplink data and to transmit downlink data to a second group of one or more STAs.

In Example 18, the subject matter of Example 17, wherein the uplink data demands may be based on sizes of uplink data or uplink data rates of the STAs of the first group.

In Example 19, an apparatus of a station (STA) may comprise memory. The apparatus may further comprise processing circuitry. The processing circuitry may be configured to receive a probe request frame from an access point (AP) that indicates an allocation of resource units (RUs) to be used by one or more STAs for orthogonal frequency division multiple access (OFDMA) transmission of one or more probe response frames. The processing circuitry may be further configured to, when the probe request frame indicates that the STA is to transmit an uplink data demand, encode the uplink data demand for transmission in a probe response frame in the RU allocated to the STA in the probe request frame. The processing circuitry may be further configured to decode a trigger frame (TF) from the AP that indicates, for a full duplex (FD) communication during a transmission opportunity (TXOP), a downlink group of STAs that are to receive downlink data and an uplink group of STAs that are to transmit uplink data. The processing circuitry may be further configured to decode downlink data from the AP when the STA is included in the downlink group and encode uplink data for transmission to the AP when the STA is included in the uplink group.

In Example 20, the subject matter of Example 19, wherein the uplink data demand may be based on a size of uplink data or uplink data rates of the STAs of the first group.

In Example 21, the subject matter of one or any combination of Examples 19-20, wherein the downlink data may be received from the AP in accordance with a downlink group of the RUs indicated by the TF. The uplink data may be encoded for transmission in accordance with an uplink group of the RUs indicated by the TF.

In Example 22, an apparatus of an access point (AP) may comprise means for determining uplink data demands and downlink data demands of one or more stations (STAs) of a master group of STAs. The apparatus may further comprise means for selecting, from the master group for a full-duplex (FD) communication, an uplink group of one or more STAs from which uplink data is to be received and a downlink group of one or more STAs to which downlink data is to be transmitted. The apparatus may further comprise means for determining, based at least partly on the uplink data demands and/or the downlink data demands, an uplink allocation of resource units (RUs) of the channel resources for an orthogonal frequency division multiple access (OFDMA) transmission by the uplink group and a downlink allocation of the RUs for an OFDMA transmission by the downlink group. The uplink and downlink allocations may be configurable for allocation of variable sizes of groups of the RUs to different STAs.

In Example 23, the subject matter of Example 22, wherein the apparatus may further comprise means for determining the variable size groups of the RUs to be allocated to the uplink group and/or downlink group to balance an expected uplink throughput of the FD communication and an expected downlink throughput of the FD communication. The expected uplink throughput may be based at least partly on the uplink data demands. The expected downlink throughput may be based at least partly on the downlink data demands.

In Example 24, the subject matter of one or any combination of Examples 22-23, wherein the apparatus may further comprise means for contending for a transmission opportunity (TXOP) during which the AP is to control access to channel resources. The apparatus may further comprise means for generating, for transmission during the TXOP, a probe request frame that indicates a request to receive one or more of the uplink data demands from one or more of the STAs of the master group. The apparatus may further comprise means for decoding one or more probe response frames that include the uplink data demands, the probe response frames included in a multi-user orthogonal frequency division multiple access (OFDMA) signal received from the one or more STAs indicated in the probe request frame. The apparatus may further comprise means for scheduling a full-duplex (FD) communication in which the AP is to use overlapping portions of the channel resources during overlapping portions of the TXOP to receive the uplink data and to transmit downlink data to a second group of one or more STAs.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point (AP), the apparatus comprising:
   memory; and
   processing circuitry, configured to:
      contend for a transmission opportunity (TXOP) during which the AP is to control access to channel resources;
      generate, for transmission during the TXOP, a probe request frame that indicates a request to receive uplink data demands from a first group of stations (STAs);
      decode one or more probe response frames that indicate the uplink data demands, the probe response frames included in a multi-user orthogonal frequency division multiple access (OFDMA) signal received from the STAs of the first group during the TXOP;
      allocate; based at least partly on the uplink data demands, resource units (RUs) of the channel resources to the STAs of the first group for an OFDMA transmission of uplink data;
      allocate the RUs to the one or more STAs of a second group for an OFDMA transmission of the downlink data;
      select different numbers of STAs for the first group of STAs and the second group of STAs to balance an aggregate downlink throughput and an aggregate uplink throughput of a full-duplex (FD) communication;
      schedule the FD communication in which the AP is to use overlapping portions of the channel resources during overlapping time periods of the TXOP to receive the uplink data and to transmit downlink data to the second group of one or more STAs.

2. The apparatus according to claim 1, wherein as part of the FD communication, the reception of at least a portion of the uplink data and the transmission of at least a portion of the downlink data are to be performed simultaneously in overlapping portions of the channel resources.

3. The apparatus according to claim 1, wherein the uplink data demands are based on sizes of uplink data or uplink data rates of the STAs of the first group.

4. The apparatus according to claim 1, wherein the processing circuitry is further configured to allocate variable size groups of the RUs to different STAs of the first group in accordance with a non-decreasing relationship between the sizes of the groups of the RUs and the uplink data demands.

5. The apparatus according to claim 4, wherein the allocation of the variable size groups of the RUs to the STAs of the first group is to enable an increase in an aggregated uplink throughput in comparison to an aggregated uplink throughput for an allocation of fixed size groups of the RUs to the STAs of the first group.

6. The apparatus according to claim 4, wherein the processing circuitry is further configured to refrain from allocation of any RUs to one or more STAs of the first group for which the uplink data demands are below a predetermined threshold.

7. The apparatus according to claim 4, the processing circuitry further configured to allocate at least one of the RUs to another STA that is not included in the first group based at least partly on an uplink data demand received from the other STA prior to transmission of the probe request frame by the AP.

8. The apparatus according to claim 1, the processing circuitry further configured to:
generate a trigger frame (TF) for transmission during the TXOP,
wherein the IT indicates the allocation of the RUs to the first group for the transmission of the uplink data and further indicates information related to the transmission of the downlink data to the second group.

9. The apparatus according to claim 1, wherein:
the allocation of the RUs for the transmission of uplink data is a first allocation, and
the probe request frame further indicates a second allocation of the RUs to the STAs of the first group for transmission of the multi-user OFDMA signal that includes the probe response frames.

10. The apparatus according to claim 1, the processing circuitry further configured to:
encode the downlink data for transmission to the second group as part of the FD communication; and
decode the uplink data received as part of an OFDMA signal from the first group as part of the FD communication.

11. The apparatus according to claim 1, wherein the processing circuitry includes a baseband processor to generate the probe request frame, decode the probe response frames, allocate the RUs to the STAs of the first group, and schedule the FD communication.

12. The apparatus according to claim 1, wherein the apparatus further includes a transceiver to transmit the probe request frame and to receive the probe response frames.

13. A non-transitory computer-readable storage medium that stores instructions for execution by one or more processors to perform operations for communication by an access point (AP), the operations to configure the one or more processors to:
determine uplink data demands and downlink data demands of one or more stations (STAs) of a master group of STAs;
select, from the master group for a full-duplex (FD) communication, different numbers of STAs for an uplink group of one or more STAs from which uplink data is to be received and a downlink group of one or more STAs to which downlink data is to be transmitted, wherein the selection is made to balance an aggregate downlink throughput and an aggregate uplink throughput of the FD communication; and
determine, based at least partly on the uplink data demands and/or the downlink data demands, an uplink allocation of resource units (RUs) of the channel resources for an orthogonal frequency division multiple access (OFDMA) transmission by the uplink group and a downlink allocation of the RUs for an OFDMA transmission by the downlink group,
wherein the uplink and downlink allocations are configurable for allocation of variable sizes of groups of the RUs to different STAs;
schedule the FD communication in which the AP is to use overlapping portions of the channel resources during overlapping portions of the TXOP to receive the uplink data and to transmit downlink data to a second group of one or more STAs.

14. The non-transitory computer-readable storage medium according to claim 13, the operations to further configure the one or more processors to:
wherein the aggregate uplink throughput is based at least partly on the uplink data demands, and
wherein the aggregate downlink throughput is based at least partly on the downlink data demands.

15. The non-transitory computer-readable storage medium according to claim 13, the operations to further configure the one or more processors to:
contend for a transmission opportunity (TXOP) during which the AP is to control access to channel resources;
generate; for transmission during the TXOP, a probe request frame that indicates a request to receive one or more of the uplink data demands from one or more of the STAs of the master group; and
decode one or more probe response frames that include the uplink data demands, the probe response frames included in an OFDMA signal received from the one or more STAs indicated in the probe request frame.

16. A method of communication at an access point (AP), comprising:
contending for a transmission opportunity (TXOP) during which the AP is to control access to channel resources;
generating, for transmission during the TXOP, a probe request frame that indicates a request to receive uplink data demands from a first group of stations (STAs);
decoding one or more probe response frames that include the uplink data demands, the probe response frames included in a multi-user orthogonal frequency division multiple access (OFDMA) signal received from the first group of STAs during the TXOP;
allocating, based at least partly on the uplink data demands, resource units (RUs) of the channel resources to the STAs of the first group for an OFDMA transmission of uplink data;
allocating the RUs to the one or more STAs of a second group for an OFDMA transmission of the downlink data;
selecting different numbers of STAs for the first group of STAs and the second group of STAs to balance an aggregate downlink throughput and an aggregate uplink throughput of a full-duplex (FD) communication;
scheduling the FD communication in which the AP is to use overlapping portions of the channel resources during overlapping time periods of the TXOP to receive the uplink data and to transmit downlink data to a second group of one or more STAs.

17. The method according to claim 16, wherein the uplink data demands are based on sizes of uplink data or uplink data rates of the STAs of the first group.

18. An apparatus of a station (STA), the apparatus comprising:
memory; and
processing circuitry, configured to:
receive a probe request frame from an access point (AP) that indicates an allocation of resource units (RUs) to be used by one or more STAs for orthogonal frequency division multiple access (OFDMA) transmission of one or more probe response frames;
when the probe request frame indicates that the STA is to transmit an uplink data demand, encode the uplink data demand for transmission in a probe response frame in the RU allocated to the STA in the probe request frame; and decode a trigger frame (TF) from the AP that indicates, for a full duplex (FD) communication during a transmission opportunity (TXOP), a downlink group of STAs that are to receive downlink data and an uplink group of STAs that are to transmit uplink data, wherein the TF indicates different numbers of STAs for the first group of STAs and the second group of STAs to balance an aggregate downlink throughput and an aggregate uplink throughput of a full-duplex (FD) communication; and decode downlink data from the AP when the STA is included in the downlink group and encode uplink data for transmission to the AP when the STA is included in the uplink group.

19. The apparatus according to claim 18, wherein the uplink data demand is based on a size of uplink data or uplink data rates of the STAs of the first group.

20. The apparatus according to claim 18, wherein:

the downlink data is received from the AP in accordance with a downlink group of the RUs indicated by the TF, and the uplink data is encoded for transmission in accordance with an uplink group of the RUs indicated by the TF.

* * * * *

UNITED STATES PATENT AND TRADEMARK OFFICE
CERTIFICATE OF CORRECTION

PATENT NO. : 10,277,383 B2  
APPLICATION NO. : 15/274780  
DATED : April 30, 2019  
INVENTOR(S) : Min et al.

It is certified that error appears in the above-identified patent and that said Letters Patent is hereby corrected as shown below:

In the Claims

Column 22, Line 26, Claim 1, delete "allocate;" and insert --allocate,-- therefor Column 23, Line 11, Claim 8, delete "IT" and insert --TF-- therefor Column 24, Line 14, Claim 15, delete "generate;" and insert --generate,-- therefor Column 24, Line 67, Claim 18, after "frame;", delete "and"

Signed and Sealed this  
Twenty-eighth Day of April, 2020

Andrei Iancu  
*Director of the United States Patent and Trademark Office*